United States Patent Office.

AUGUST STOCK, OF HÖCHST-ON-THE-MAIN, GERMANY, ASSIGNOR TO THE FARBWERKE, VORMALS MEISTER, LUCIUS & BRÜNING, OF SAME PLACE.

INDOXYL DERIVATIVES AND PROCESS OF MAKING SAME.

SPECIFICATION forming part of Letters Patent No. 662,703, dated November 27, 1900.

Application filed July 5, 1898. Serial No. 685,156. (No specimens.)

*To all whom it may concern:*

Be it known that I, AUGUST STOCK, Ph. D., a citizen of the Empire of Germany, residing at Höchst-on-the-Main, Germany, have invented certain new and useful Improvements in the Manufacture of Derivatives of Indoxyl, of which the following is a specification.

This invention relates to the manufacture of derivatives of indoxyl, which are of great importance in the production of indigo and its homologues.

It is known that acid ethers when treated with sodium alcoholate or metallic sodium react in splitting off alcohol with such acid ethers and ketones as contain in the neighborhood of the carbonyl group a methyl or a methylen group. By this reaction the sodium compounds of ketonic acid ethers and diketones are formed after the following equations:

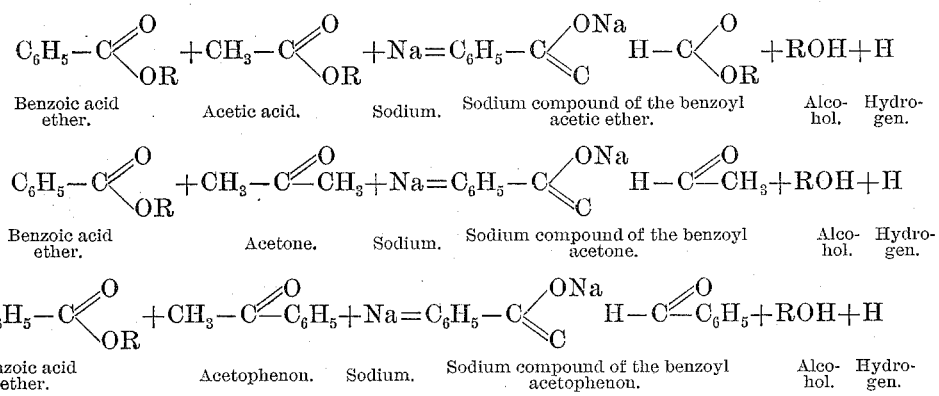

Acids separate from these sodium compounds the ketone acid ethers and the diketones themselves, for which, besides the above formulas, the following are to be taken into consideration:

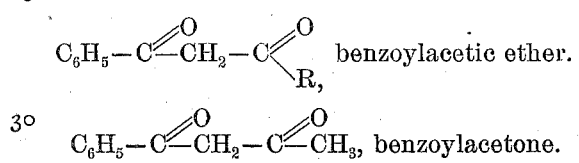

$C_6H_5-C(\!=\!\!O)-CH_2-O(\!=\!\!O)-C_6H_5$, benzoylacetophenon.

An analogous reaction takes place intermolecularly by the action of sodium alcoholate or metallic sodium upon the ethers of aromatic ortho-amido-carbonic acids, which contain at the nitrogen atom the group $-CH_2-C(\!=\!\!O)-$. For instance:

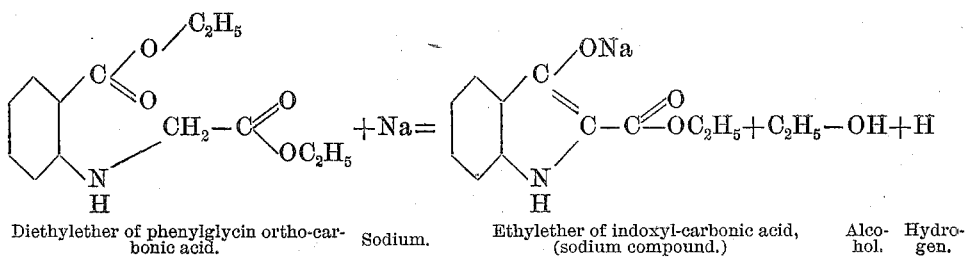

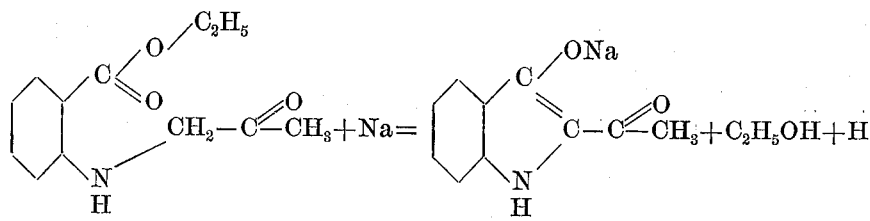

Ethylether of acetonyl-anthranil acid. Sodium.     Indoxylmethylketone, (sodium compound.)    Alcohol.   Hydrogen.

For producing indoxylmethylketone the process may be carried out as follows: twenty parts, by weight, of ethyl ether of acetonylanthranil acid obtained by combining ethyl ether of anthranil acid with chloracetone are dissolved in ten times their quantity of benzene (or any other indifferent dissolving agent) and 2.3 parts of sodium finely divided are added. To start the reaction, it is advisable to add a few drops of alcohol and to aid it by heating slowly. Thus the sodium compound of the indoxylmethylketone soon separates with a rapid generation of hydrogen as a white precipitate. When all the sodium has disappeared, it is allowed to cool and then agitated with a dilute acid, whereby the indoxylmethylketone is separated from the sodium compound. By removing the benzene layer and distilling off the benzene the indoxylmethylketone is obtained as an oil, which soon coagulates in a crystalline form.

The indoxylmethylketone is a weak yellow body easily turning a little darker in the air. The compound melts at 153°. It is easily soluble in ether, alcohol, and hot benzene and difficultly soluble in chloroform. The indoxylmethylketone is soluble in caustic alkalies and is reseparated from this solution by means of acids.

When heated with caustic alkali, an intense yellow melt is formed, which dissolved in water separates indigo when exposed to the air. Concentrated sulfuric acid dissolves the ketone with a yellow color, which turns on heating and in consequence of the formation of indigo from green to blue.

Having thus described my invention, I claim as new and desire to secure by Letters Patent—

1. The herein-described process of manufacturing indoxyl derivatives, consisting in treating with sodium those derivatives of the ethers of aromatic ortho-amido-carbonic acid which contain at the nitrogen atom the group $-CH_2-C\diagup^O$, substantially as set forth.

2. As a new article of manufacture, the product obtained by treating with sodium the ethers of acetonylanthranil acid (indoxylmethylketone,) being a substance melting at 153°, easily soluble in alcohol, ether or hot benzene, soluble with difficulty in chloroform and forming indigo when heated with sulfuric acid or when melted with alkali and exposing the aqueous solution of this melt to the air, substantially as set forth.

In testimony that I claim the foregoing as my invention I have signed my name in presence of two subscribing witnesses.

AUGUST STOCK.

Witnesses:
   HEINRICH HAHN,
   BERNHARD LEYDECKER.